(12) United States Patent
Shin

(10) Patent No.: US 9,020,352 B2
(45) Date of Patent: Apr. 28, 2015

(54) OPTICAL COMMUNICATION MODULE

(75) Inventor: Hyunee Shin, Daejeon (KR)

(73) Assignee: Opticis Co., Ltd., Seongnam-si (KR)

( * ) Notice: Subject to any disclaimer, the term of this patent is extended or adjusted under 35 U.S.C. 154(b) by 74 days.

(21) Appl. No.: 13/881,278

(22) PCT Filed: Nov. 3, 2011

(86) PCT No.: PCT/KR2011/008325
§ 371 (c)(1),
(2), (4) Date: Apr. 24, 2013

(87) PCT Pub. No.: WO2012/067366
PCT Pub. Date: May 24, 2012

(65) Prior Publication Data
US 2013/0230327 A1    Sep. 5, 2013

(30) Foreign Application Priority Data

Nov. 18, 2010 (KR) .................. 10-2010-0114765

(51) Int. Cl.
*H04J 14/02* (2006.01)
*G02B 6/293* (2006.01)
(Continued)

(52) U.S. Cl.
CPC ......... *H04J 14/0227* (2013.01); *G02B 6/29365* (2013.01); *G02B 6/4246* (2013.01); *H04B 10/2503* (2013.01); *H04J 14/0254* (2013.01); *H04J 14/0265* (2013.01)

(58) Field of Classification Search
CPC .............. G02B 6/29365; G02B 6/4246; H04J 14/0254; H04J 14/0227; H04J 14/0265; H04B 10/2503
See application file for complete search history.

(56) References Cited

U.S. PATENT DOCUMENTS 5,357,127 A * 10/1994 Park et al. .................. 257/189
5,555,119 A *  9/1996 Lewis ........................ 398/161

(Continued)

FOREIGN PATENT DOCUMENTS

JP       61-244138 A       10/1986
JP    2003-185876 A        7/2003
(Continued)

OTHER PUBLICATIONS

International Search Report and Written Opinion for PCT/KR2011/008325, mailed Apr. 6,2012; ISA/KR.

(Continued)

*Primary Examiner* — Ken Vanderpuye
*Assistant Examiner* — David Lambert
(74) *Attorney, Agent, or Firm* — Harness, Dickey & Pierce, PLC

(57) ABSTRACT

The present invention relates to an optical communication module, which includes: a first bidirectional multiplexer; a second bidirectional multiplexer; an optical fiber for connecting the first bidirectional multiplexer and the second bidirectional multiplexer to each other; one or more first light emitting devices connecting to the first bidirectional multiplexer, and operating in a first light emitting wavelength band; one or more first light receiving devices connecting to the first bidirectional multiplexer, and operating in a first light receiving wavelength band; one or more second light receiving devices connecting to the second bidirectional multiplexer, and operating in a second light receiving wavelength band; and one or more second light emitting devices connecting to the second bidirectional multiplexer, and operating in a second light emitting wavelength band. The second light emitting wavelength band includes the first light receiving wavelength band, and the first light emitting wavelength band includes the second light receiving wavelength band. The first light receiving wavelength band is different from the second light receiving wavelength band.

6 Claims, 7 Drawing Sheets

(51) Int. Cl.
*G02B 6/42* (2006.01)
*H04B 10/25* (2013.01)

(56) References Cited

U.S. PATENT DOCUMENTS

| | | | |
|---|---|---|---|
| 7,501,294 B1* | 3/2009 | Nakagawa | 438/22 |
| 2002/0089719 A1 | 7/2002 | Joo et al. | |
| 2003/0007538 A1* | 1/2003 | Jiang et al. | 372/75 |
| 2003/0072056 A1* | 4/2003 | Ota | 359/124 |
| 2005/0041971 A1 | 2/2005 | Lee et al. | |
| 2005/0069013 A1* | 3/2005 | Bhandarkar et al. | 372/102 |

FOREIGN PATENT DOCUMENTS

| | | |
|---|---|---|
| JP | 2005-333264 A | 12/2005 |
| JP | 2008112149 A | 5/2008 |
| KR | 10-2001-0088219 A | 9/2001 |
| KR | 10-2002-0059914 A | 7/2002 |
| KR | 10-2005-0020527 A | 3/2005 |
| KR | 10201400008761 A | 1/2010 |

OTHER PUBLICATIONS

JP office action dated Jan. 28, 2014.

* cited by examiner

OPTICAL COMMUNICATION MODULE

CROSS-REFERENCE TO RELATED APPLICATIONS

This application is a 371 U.S. National Stage of International Application No. PCT/KR2011/008325, filed Nov. 3, 2011, and claims priority to Korean Patent Application 10-2010-0114765, filed Nov. 18, 2010, the disclosures of which are herein incorporated by reference in their entirety.

TECHNICAL FIELD

The present invention relates to an optical communication module, and more particularly, to an optical communication module for transmitting and receiving optical signals in different wavelength bands through a single optical fiber.

BACKGROUND ART

A wavelength-division multiplexing (WDM) method is used to transmit optical signals of different wavelengths through a single optical fiber.

DETAILED DESCRIPTION OF THE INVENTION

Technical Problem

The present invention provides an optical communication module that reduces cross-talk between a light receiving device and a light emitting device.

Technical Solution

According to an aspect of the present invention, there is provided an optical communication module including a first bi-directional multiplexer, a second bi-directional multiplexer, an optical fiber connecting the first bi-directional multiplexer and the second bi-directional multiplexer, at least one of first light emitting devices connected to the first bi-directional multiplexer and operating in a first light emitting wavelength band, at least one of first light receiving devices connected to the second bi-directional multiplexer and operating in a first light receiving wavelength band, at least one of second light emitting devices connected to the second bi-directional multiplexer and operating in a second light emitting wavelength band that is different from the first light emitting wavelength band, and at least one of second light receiving devices connected to the first bi-directional multiplexer and operating in a second light receiving wavelength band, wherein the first light emitting wavelength band is included in the first light receiving wavelength band, and the second light emitting wavelength band is included in the second light receiving wavelength band.

Advantageous Effects

The optical communication module according to the present invention includes at least two groups of light receiving devices having different light receiving wavelength bands. Also, the optical communication module according to the present invention includes at least two groups of light emitting devices having different light emitting wavelength bands. The first light emitting devices operate in a first light emitting wavelength band, and the second light emitting devices operate in a second light emitting wavelength band.

The first light emitting wavelength band is included in a first light receiving wavelength band. The second light emitting wavelength band is included in a second light receiving wavelength band. Accordingly, cross-talk between the first light emitting devices and the second light receiving devices is reduced. Also, the cross-talk between the second light emitting devices and the first light receiving devices is reduced.

Figure 1:
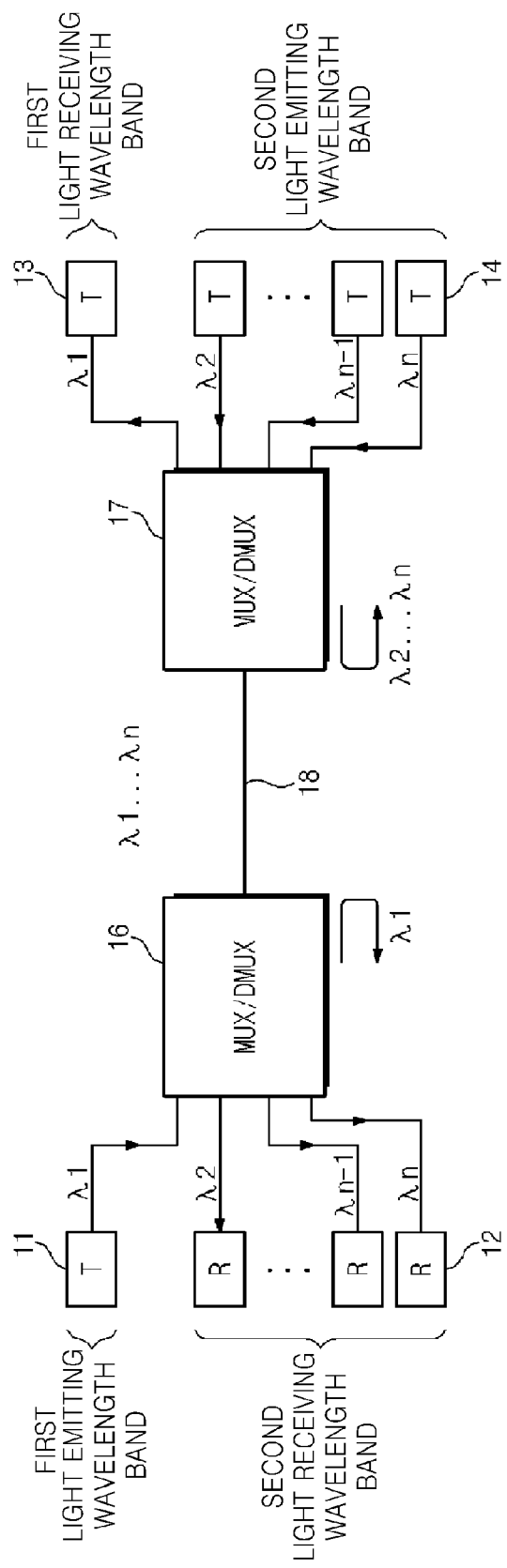
FIG. 1 is a block diagram schematically illustrating an optical communication module according to an embodiment of the present invention.

16: first bidirectional multiplexer
17: second bidirectional multiplexer
18: optical fiber
11: first light emitting devices
12: second light receiving devices
13: first light receiving devices
14: second light emitting devices

BEST MODE

The attached drawings for illustrating exemplary embodiments of the present invention are referred to in order to gain a sufficient understanding of the present invention, the merits thereof, and the objectives accomplished by the implementation of the present invention. Hereinafter, the present invention will be described in detail by explaining exemplary embodiments of the invention with reference to the attached drawings. In the drawings, constituent elements are exaggeratedly drawn for clarity. Like reference numerals in the drawings denote like elements.

Figure 2:
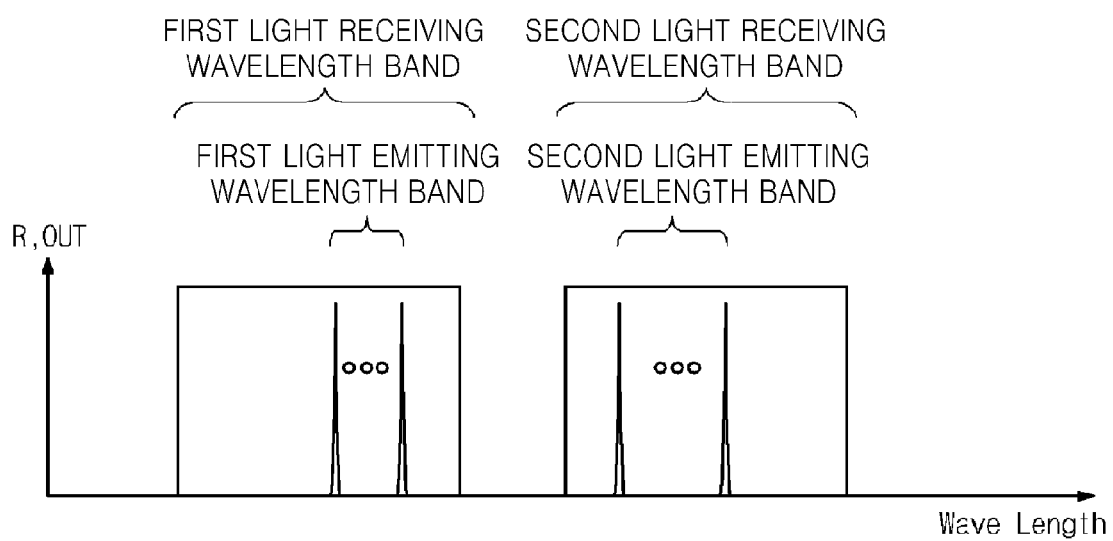
FIG. 2 is a graph for explaining a wavelength band of the optical communication module of FIG. 1.

FIG. 1 is a block diagram schematically illustrating an optical communication module according to an embodiment of the present invention. FIG. 2 is a graph for explaining a wavelength band of the optical communication module of FIG. 1.

Referring to FIGS. 1 and 2, the optical communication module according to the present embodiment includes a first bidirectional multiplexer 16, a second bidirectional multiplexer 17, an optical fiber 18 connecting the first bidirectional multiplexer 16 and the second bidirectional multiplexer 17 to each other, one or more first light emitting devices 11 connected to the first bidirectional multiplexer 16 and operating in a first light emitting wavelength band, one or more first light receiving devices 13 connected to the second bidirectional multiplexer 17 and operating in a first light receiving wavelength band, one or more second light emitting devices 14 connected to the second bidirectional multiplexer 17 and operating in a second light emitting wavelength band that is different from the first light emitting wavelength band, and one or more second light receiving devices 12 connected to the first bidirectional multiplexer 16 and operating in a second light receiving wavelength band.

Wavelength-division multiplexing type optical communication is used to convert signals of multiple channels to optical signals of various wavelengths and transmit the converted optical signals through a single optical fiber. Accordingly, a multiplexer for connecting multiple optical signals to a single optical fiber and a demultiplexer for splitting multiple optical signals from a single optical fiber according to a wavelength thereof are needed. There are many methods for multiplexing and demultiplexing, and a method including a wavelength selection filter has a simple structure. Multiplexing and demultiplexing may not be structurally different from each other, and a demultiplexing function may be obtained by locating a wavelength selection filter before a light receiving device.

The first light emitting wavelength band is included in the first light receiving wavelength band. The second light emitting wavelength band is included in the second light receiving wavelength band. The first light receiving wavelength band and the second light receiving wavelength band may be split from each other without being overlapped with each other.

The first bidirectional multiplexer 16 and the second bidirectional multiplexer 17 are wavelength divisional multiplexers. The bidirectional multiplexers 16 and 17 may be of an optical filter type. The bidirectional multiplexers 16 and 17 have 16 channels or lower and may be coarse wavelength division multiplexers (CWDMs) having a wavelength interval of the channels of 10 nm or more.

The first light emitting devices 11 may be connected to the channels of the first bidirectional multiplexer 16. Each of the first light emitting devices 11 may be a laser diode operating at a particular wavelength. Light emitting wavelengths of the first light emitting devices 11 are different from each other, and the light emitting wavelengths of the first light emitting devices 11 that are adjacent to each other are grouped together to form a first light emitting wavelength band.

The second light emitting devices 14 may be connected to channels of the second bidirectional multiplexer 17. Each of the second light emitting devices 14 may be a laser diode operating at a particular wavelength. Light emitting wavelengths of the second light emitting devices 14 are different from each other, and the light emitting wavelengths of the second light emitting devices 14 that are adjacent to each other are grouped together to form a second light emitting wavelength band.

The first light receiving devices 13 and the second light receiving devices 12 may be semiconductor diodes, PIN photodiodes, or avalanche photodiodes. The first light receiving devices 13 may have the same structure. The second light receiving devices 12 may have the same structure. The first light receiving devices 13 may have a spectral responsibility R with respect to light of the first light receiving wavelength band. The spectral responsibility R indicates how much an amount of current is converted with respect to an optical output input to a light receiving device. The second light receiving devices 12 may have a spectral responsibility R with respect to light of the second light receiving wavelength band. The first light receiving wavelength band is a range of over 30% of the maximum value of the spectral responsibility R with respect to the light emitting wavelengths in use. The second light receiving wavelength band is a range of over 30% of the maximum value of the spectral responsibility R with respect to the light emitting wavelengths in use.

When an InGaAs PIN structure is used, the light receiving devices may have a spectral responsibility in a range of 900 nm to 1680 nm. When a GaAs PIN structure is used, the light receiving devices may have a spectral responsibility in a range of 620 nm to 870 nm.

The first and second light emitting devices 11 and 14 transmit optical signals via the bidirectional multiplexers 16 and 17 and the optical fiber 18. However, the bidirectional multiplexers 16 and 17 have a certain loss. Also, an output light ray λ1 of one of the first light emitting devices 11 may be returned after being reflected from a point where the first bidirectional multiplexer 16 contacts an end of the optical fiber 18. Also, the output light ray λ1 may be reflected from surfaces of the other end of the optical fiber 18, surfaces of the second bidirectional multiplexer 17, surfaces of the first light receiving devices 13, and surfaces of the second light emitting devices 14. In this case, the second light receiving devices 12 may malfunction as the second light receiving devices 12 sense the reflected output light ray λ1. To reduce the malfunction, the first bidirectional multiplexer 16 may have high wavelength selectivity.

In detail, when the first bidirectional multiplexer 16 is of an optical filter type, wavelength selectivity depends on performance of a filter, and improvement in the performance of the filter may raise manufacturing costs. Accordingly, when the second light receiving devices 12 are designed not to operate in the first light emitting wavelength band, the wavelength selectivity of the first bidirectional multiplexer 16 may be reduced. Thus, the optical module may operate as the first bidirectional multiplexer 16 having a low filter performance.

The first light emitting wavelength band may be 620 nm to 870 nm. The second light receiving wavelength band may be 900 nm to 1680 nm. In this case, the second light receiving devices 12 operating in the second light receiving wavelength band may be hardly affected by a reflective light in the first light emitting wavelength band due to internal reflection of the first bidirectional multiplexer 16 or reflection at one end of the optical fiber 18.

The first light emitting devices 11 may be a vertical-cavity surface-emitting laser (VCSEL) including AlGaAs or GaAs as an active layer. Also, the second light receiving devices 12 may be a PIN photodiode including an InGaAs absorption layer grown on an InP substrate.

Output light rays λ2, . . . , λn of the second light emitting devices 14 may be returned after being reflected from a point where the second bidirectional multiplexer 17 contacts the other end of the optical fiber 18. In this case, the first light receiving devices 13 may malfunction as the first light receiving devices 13 sense the reflected output light rays λ2, . . . , λn. To reduce the malfunction, the second bidirectional multiplexer 17 may have high wavelength selectivity.

When the second bidirectional multiplexer 17 is of an optical filter type, wavelength selectivity depends on performance of a filter, and improvement in the performance of the filter may raise manufacturing costs. Accordingly, when the first light receiving devices 13 are designed not to operate in the second light emitting wavelength band, the wavelength selectivity of the second bidirectional multiplexer 17 may be reduced. Thus, the optical module may operate as the second bidirectional multiplexer 17 having a low filter performance.

The second light emitting wavelength band may be 900 nm to 1680 nm. The first light receiving wavelength band may be 620 nm to 870 nm. In this case, the first light receiving devices 13 operating in the first light receiving wavelength band may be hardly affected by a reflective light in the second light emitting wavelength band due to internal reflection of the second bidirectional multiplexer 17 or reflection at the other end of the optical fiber 18. In detail, the second light emitting devices 14 may be a vertical-cavity surface-emitting laser (VCSEL) including InGaAs as an active layer. Also, the first light receiving devices 13 may be a PIN photodiode including a GaAs absorption layer grown on a GaAs substrate.

The light emitting devices 11 and 14 may be formed to emit light rays of different wavelengths. For example, when a GaAs quantum well is used as a material for emitting light, a semiconductor laser having a wavelength of 850 nm to 870 nm may be obtained. Also, when Al is mixed into GaAs, a semiconductor laser having a wavelength shorter than 850 nm may be obtained according to an Al mixture rate. When In is mixed into GaAs, a semiconductor laser having a wavelength longer than 900 nm may be obtained.

The light receiving devices 12 and 13 may have spectral responsibility R depending on a wavelength and a light receiving wavelength band. For example, the light receiving devices 12 and 13 may have wavelength selectivity by using GaAs, InGaAs, or AlGaAs. In detail, when an InGaAs absorption layer grown on an InP substrate is used, the light receiving devices 12 and 13 may have a light receiving wavelength band of 900 nm to 1680 nm. When a GaAs absorption layer grown on a GaAs substrate is used, the light receiving devices 12 may have a light receiving wavelength band of 620 nm to 870 nm. The light receiving wavelength band is a range having the spectral responsibility R of over 30% of the maximum value of the light emitting wavelengths in use.

For example, the first light emitting devices 11 may operate in the first light emitting wavelength band of 620 nm to 870 nm by using a GaAs or AlGaAs based material. The second light receiving devices 12 may have the second light emitting wavelength band of 900 nm to 1680 nm by using an InGaAs based material. The second light emitting devices 14 may operate in the second light emitting wavelength band of 900 nm to 1680 nm by using an InGaAs based material. The first light receiving devices may have the first light receiving wavelength band of 620 nm to 870 nm by using a GaAs based material. The first light receiving wavelength band and the second light receiving wavelength band are split from each other without being overlapped with each other. In this case, cross-talk between the first light emitting devices 11 and the second light receiving devices 12 is reduced. Also, cross-talk between the second light emitting devices 14 and the first light receiving devices 13 is reduced. Accordingly, the filters may be operated, even if performance thereof is degraded.

Figure 3:
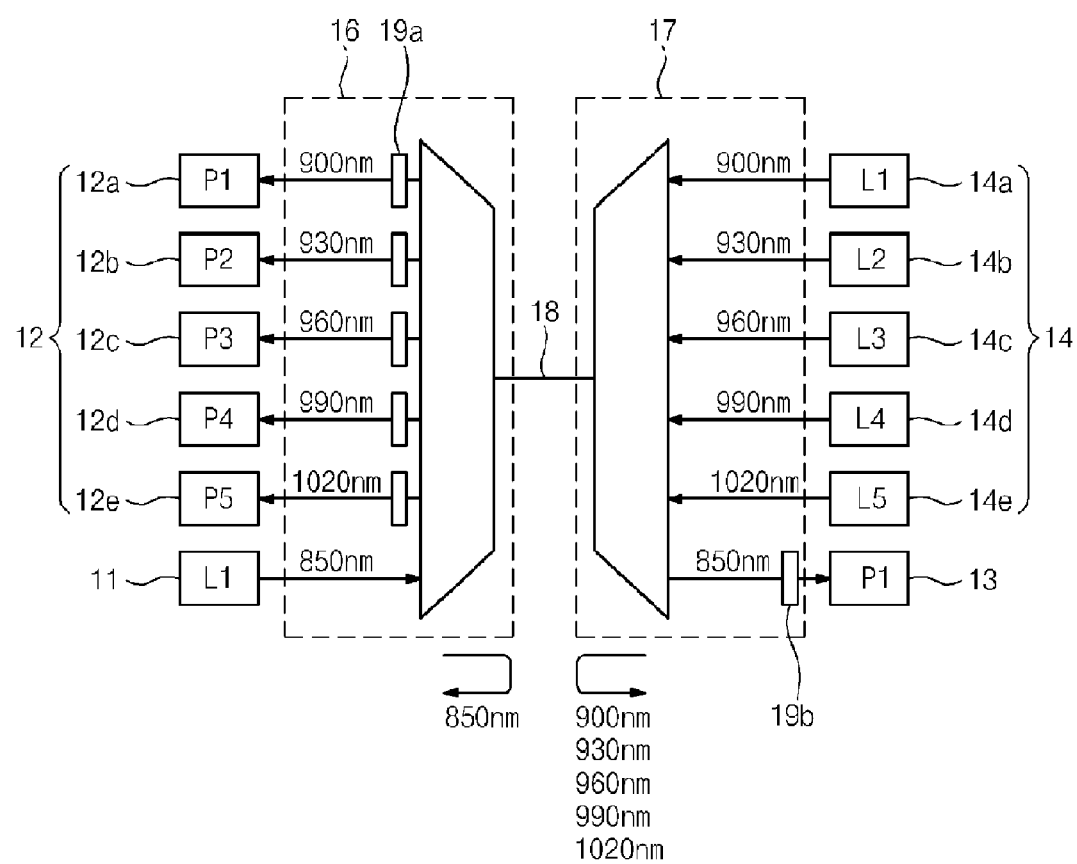
FIG. 3 is a block diagram schematically illustrating an optical communication module according to another embodiment of the present invention.
Figure 4:
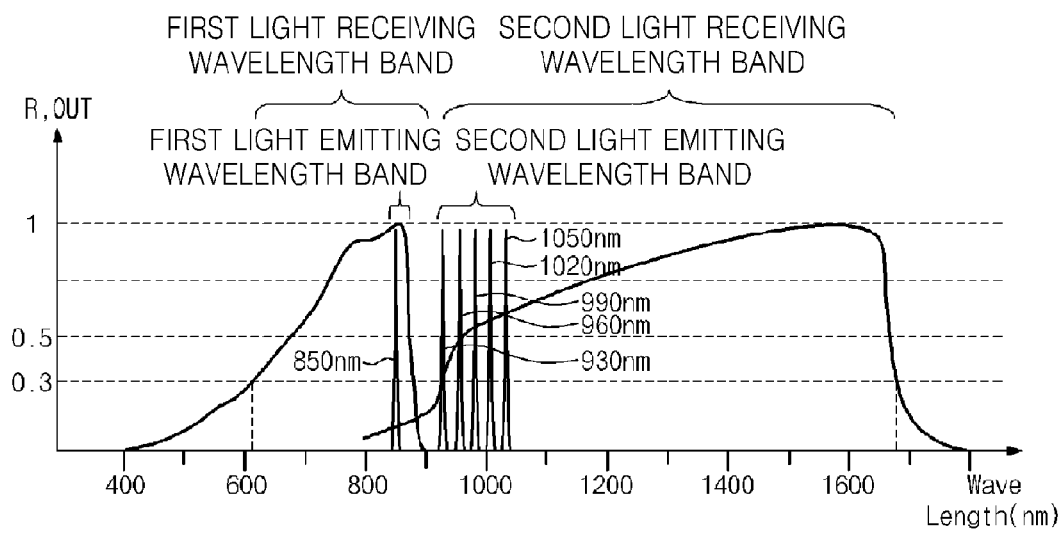
FIG. 4 is a graph for explaining a wavelength band of the optical communication module of FIG. 3.

FIG. 3 is a block diagram schematically illustrating an optical communication module according to another embodiment of the present invention. FIG. 4 is a graph for explaining a wavelength band of the optical communication module of FIG. 3.

Referring to FIGS. 3 and 4, the optical communication module according to the present embodiment includes the first bidirectional multiplexer 16, the second bidirectional multiplexer 17, the optical fiber 18 connecting the first bidirectional multiplexer 16 and the second bidirectional multiplexer 17 to each other, one or more first light emitting devices 11 connected to the first bidirectional multiplexer 17 and operating in a first light emitting wavelength band, one or more first light receiving devices 13 connected to the second bidirectional multiplexer 17 and operating in a first light receiving wavelength band, one or more second light emitting devices 14 connected to the second bidirectional multiplexer 17 and operating in a second light emitting wavelength band that is different from the first light emitting wavelength band, and one or more second light receiving devices 12 connected to the first bidirectional multiplexer 16 and operating in a second light receiving wavelength band.

The first light emitting wavelength band is included in the first light receiving wavelength band. The second light emitting wavelength band is included in the second light receiving wavelength band. The first light receiving wavelength band and the second light receiving wavelength band may be split from each other without being overlapped with each other.

Typically, when a plurality of optical signals of different wavelengths are transmitted through a single optical fiber and a multiplexer, the light receiving devices use the same structure. In this case, reconstruction of the original optical signals is totally dependent on a wavelength selection filter. Thus, a method to reduce costs of the wavelength selection filter by reducing performance of the wavelength selection filter is needed.

A channel of the first bidirectional multiplexer 16 connected to the first light emitting devices 11 may not include an optical filter 19a. A channel of the second bidirectional multiplexer 17 connected to the second light emitting devices 14 may not include an optical filter 19b.

In detail, only one first light emitting device 11 is provided, and a wavelength of an output OUT of the first light emitting device 11 is 850 nm. Also, five second light receiving devices 12 are provided, and the second light receiving wavelength band may be 900 nm to 1680 nm. The second light receiving devices 12a to 12e adopt the same structure. The spectral responsibility R of each of the second light receiving devices 12 is sharply reduced at a wavelength of 900 nm or lower. Thus, the second light receiving devices 12 are difficult to be used at a wavelength of 900 nm or lower.

The number of the second light emitting devices 14a to 14e is five, and a center wavelength of an output OUT of each of the second light emitting devices 14a to 14e are respectively 930 nm, 960 nm, 990 nm, 1020 nm, and 1050 nm. The number of the first light receiving devices 13 is one, and the first light receiving wavelength band may be 620 nm to 870 nm. The spectral responsibility R of each of the first light receiving devices 13 is sharply reduced at a wavelength of 870 nm or above. Thus, the first light receiving devices 13 are difficult to be used at a wavelength of 870 nm or above. Also, when a reflection light of the second light emitting device 14a having a wavelength of 930 nm is incident upon the first light receiving devices 13, the spectral responsibility of each of the first light receiving devices 13 is low. Thus, a wavelength selection filter having a low wavelength selection performance may be used as the wavelength selection filter 19b, or no wavelength selection filter may be used therefor.

According to a modified embodiment of the present invention, the number of the second light emitting devices 14a to 14e is five, and a center wavelength of an output OUT of the second light emitting devices 14a to 14e may be variously modified to 1000 nm, 1030 nm, 1060 nm, 1090 nm, and 1120 nm.

According to the modified embodiment, the filter included in the bidirectional multiplexer may be modified to be included in an optical system located in front of the light receiving device.

According to the modified embodiment, one to five channels are provided in the first light emitting wavelength band, and a five to one channel is provided in the second light emitting wavelength band.

Figure 5:
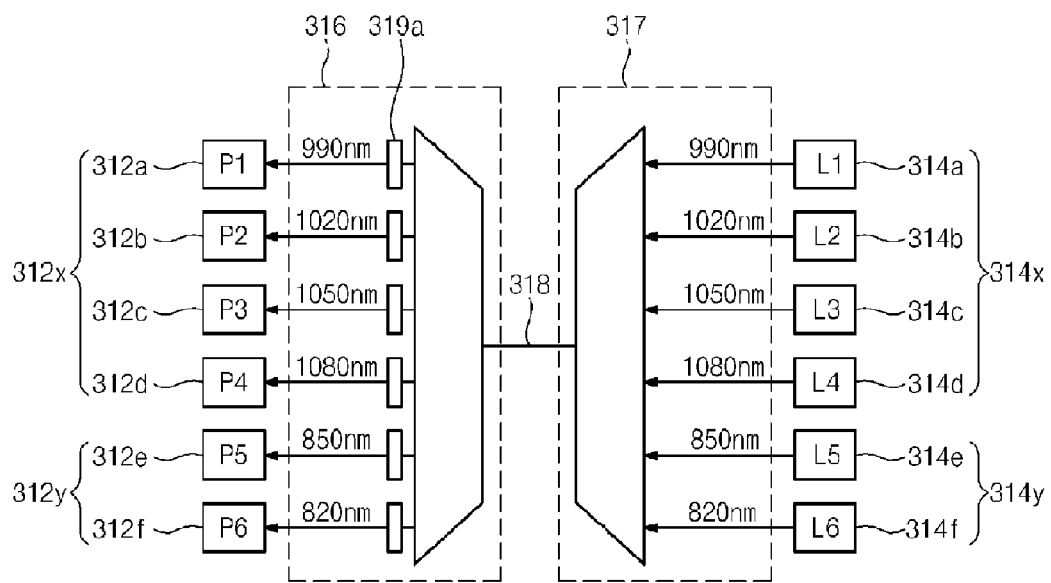
FIG. 5 is a block diagram schematically illustrating an optical communication module according to another embodiment of the present invention.
Figure 6:
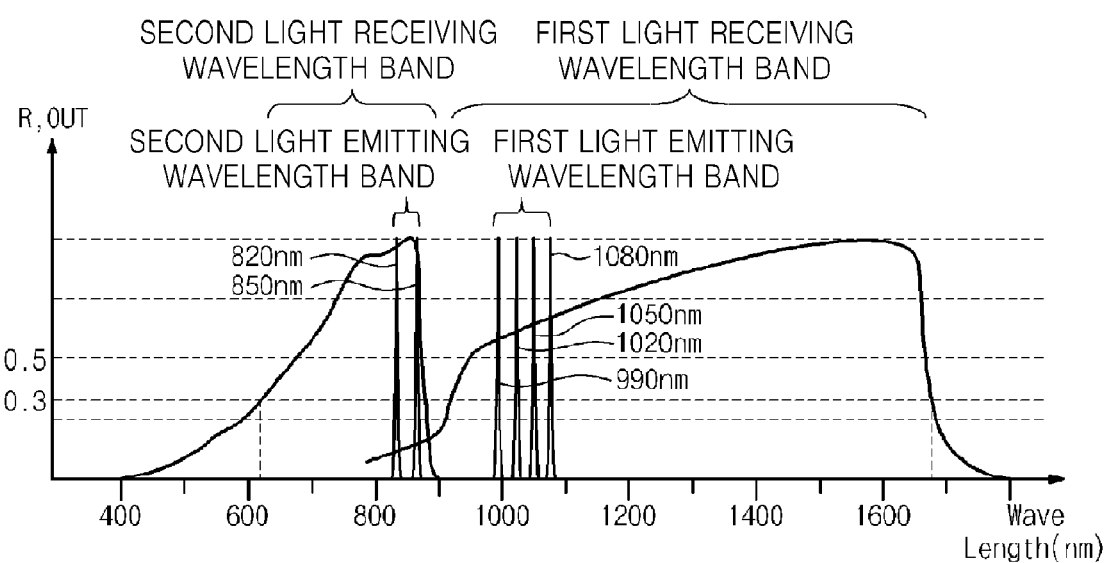
FIG. 6 is a graph for explaining a wavelength band of the optical communication module of FIG. 5.

FIG. 5 is a block diagram schematically illustrating an optical communication module according to another embodiment of the present invention. FIG. 6 is a graph for explaining a wavelength band of the optical communication module of FIG. 5.

Referring to FIGS. 5 and 6, the optical communication module includes a multiplexer 317, a demultiplexer 316, an optical fiber 318 connecting the multiplexer 317 and the demultiplexer 316, one or more first light emitting devices 314x connected to the multiplexer 317 and operating in a first light emitting wavelength band, one or more second light emitting devices 314y connected to the multiplexer 317 and operating in a second light emitting wavelength band, one or more first light receiving devices 312x connected to the demultiplexer 316 and operating in a first light receiving wavelength band, and one or more second light receiving devices 312y connected to the demultiplexer 316 and operating in a second light receiving wavelength band.

The first light emitting wavelength band is included in the first light receiving wavelength band. The second light emitting wavelength band is included in the second light receiving wavelength band. The first light receiving wavelength band and the second light receiving wavelength band are different from each other.

Channels of the multiplexer 317 connected to the first light emitting devices 314x may not include an optical filter. Channels of the multiplexer 317 connected to the second light emitting devices 314y may not include an optical filter.

In detail, the number of the first light emitting devices 314a, 314b, 314c, and 314d is four, and wavelengths of outputs OUT of the first light emitting devices 314x are 990 nm, 1020 nm, 1050 nm, and 1080 nm. The first light emitting wavelength band may be 990 nm to 1080 nm.

In detail, the number of the second light emitting devices 314e and 314f is two, and wavelengths of outputs OUT of the second light emitting devices 314y are 820 nm and 850 nm. The second light emitting wavelength band may be 820 nm to 850 nm.

The number of the first light receiving devices 312x is four, and the first light receiving wavelength band may be 900 nm to 1680 nm. The first light receiving devices 312a to 312d have the same structure.

The number of the second light receiving devices 312y is two, and the second light receiving wavelength band may be 620 nm to 870 nm. The second light receiving devices 312e and 312f have the same structure.

Thus, even when a light ray having a wavelength of 820 nm emitted by the second light emitting device 314f is incident upon the first light receiving devices 312x, the spectral responsibility R of each of the first light receiving devices 312x is low. Thus, even when the performance of the filter 319a connected to a channel of the demultiplexer 316 is degraded, the optical communication module may operate.

According to a modified embodiment, the number of the first light emitting devices may be five and the number of the second light emitting devices may be one. The output wavelengths of the first light emitting devices are 990 nm, 1020 nm, 1050 nm, 1080 nm, and 1110 nm. The output wavelength of the second light emitting devices may be 800 nm. The first light receiving wavelength band of the first light receiving devices may be 900 nm to 1680 nm. Also, the second light receiving wavelength band may be 620 nm to 870 nm. In this case, the demultiplexer of a channel connected to the second light receiving devices may operate with a filter.

Figure 7A:
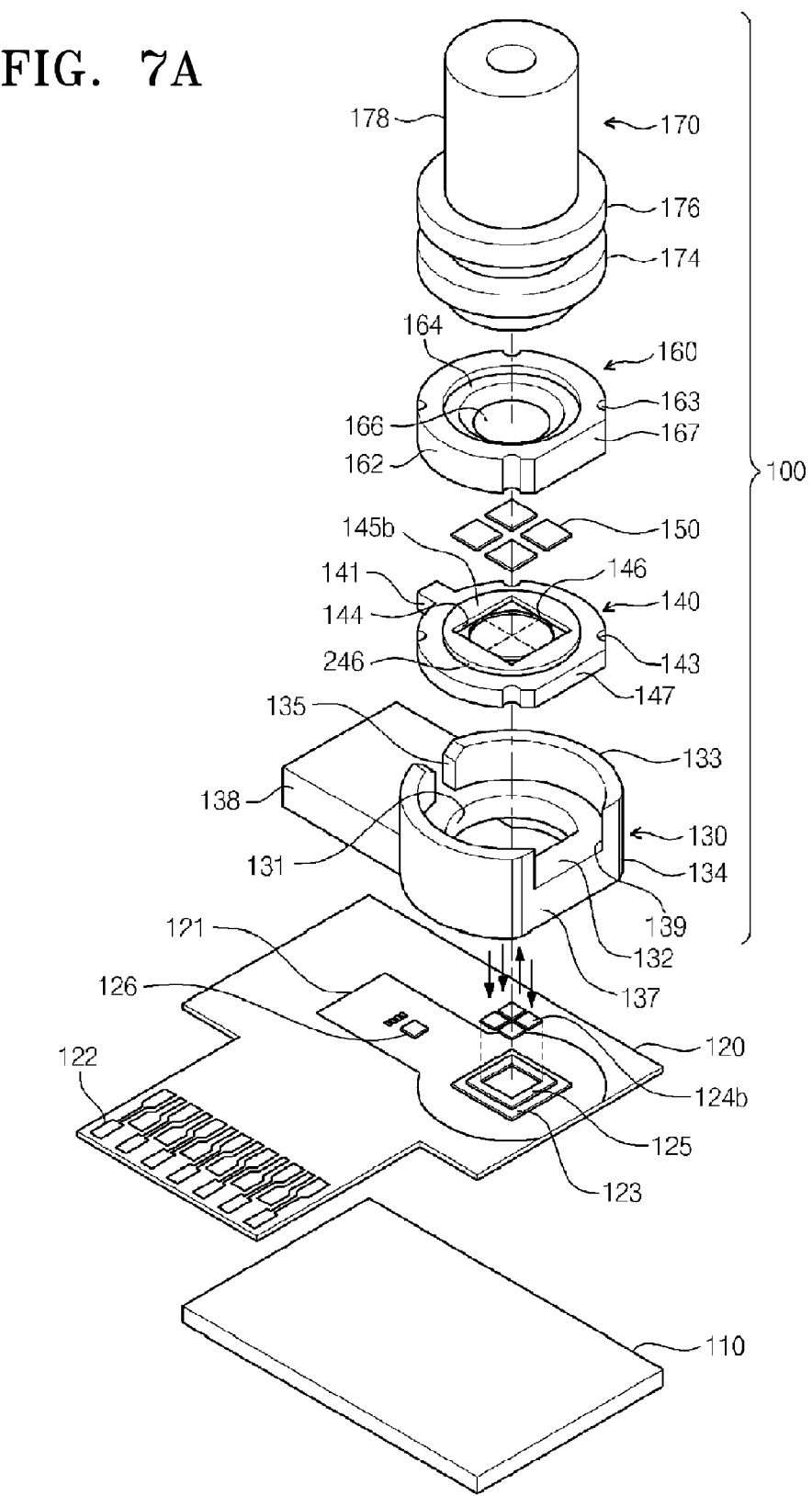
FIGS. 7A and 7B respectively illustrate an exploded perspective view and a cross-sectional view, of a bi-directional multiplexer of an optical communication module according to another embodiment of the present invention.
Figure 7B:
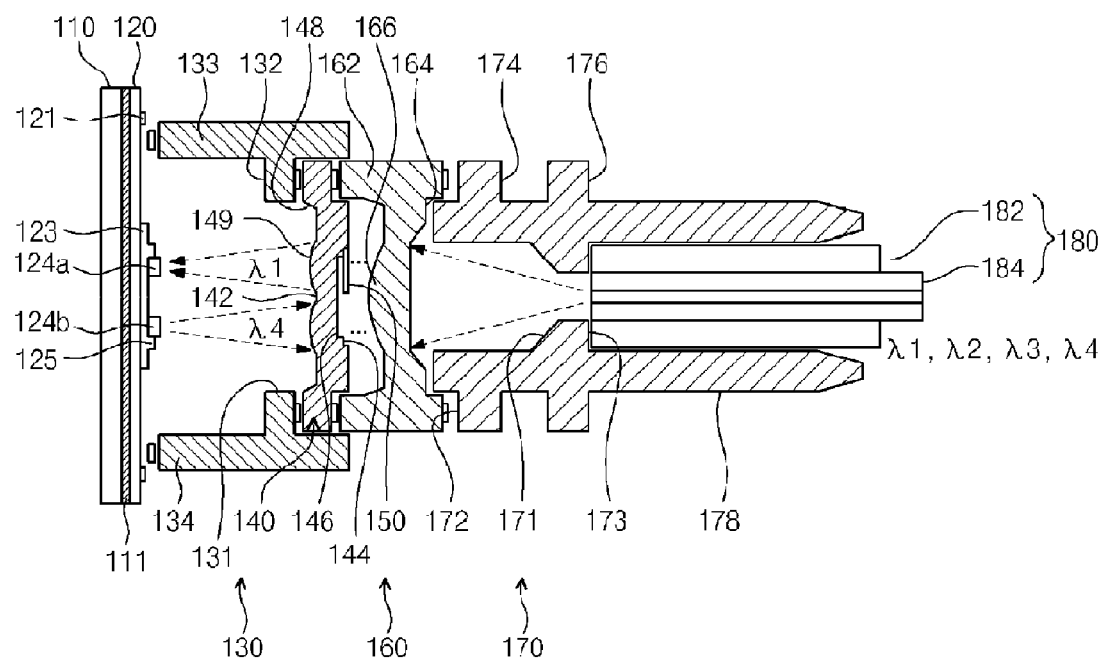

FIGS. 7A and 7B respectively illustrate an exploded perspective view and a cross-sectional view, of a multiplexer 100 forming an optical communication module according to another embodiment of the present invention.

Referring to FIGS. 7A to 7B, the multiplexer 100 includes a first lens block 140 having a lens array 149 at one side thereof, a second lens block 160 having a lens surface corresponding to the lens array 149 and combined with the other side of the first lens block 140, a receptacle 170 having an optical fiber ferrule 180 fixed at the center thereof and stacked on the second lens block 160, and a base 130 combined with one side of the first lens block 140. The first lens block 140 is stacked on the base 130. The base 130 and the first lens block 140 may be insertion combined with each other.

The first lens block 130 may have a shape similar to a disc. The lens array 149 may be arranged on a first surface of the first lens block 140. A hollow 148 to protect the lens array 149 having a predetermined depth may be arranged at one side of the first lens block 140. The hollow 148 may have a cylindrical shape with respect to a center axis of the first lens block 140. A bottom surface of the hollow 148 forms the first surface, and the lens array 149 may be formed on the first surface. The first lens block 140 may be formed in one body and of a transparent plastic or acryl material.

The lens array 149 may be symmetrically arranged around the center axis of the first lens block 140. For example, the lens array 149 may include first to fourth auxiliary lenses. Each of the first to fourth auxiliary lenses may have a reference point. Each of the first to fourth auxiliary lenses may collimate a light ray starting from a focus thereof into a parallel light. The first to fourth auxiliary lenses may focus a parallel light incident upon the first to fourth auxiliary lenses to focuses thereof.

A portion where the first to fourth auxiliary lenses are adjacent to one other may form a separation region 142 that has a different radius of curvature from that of the first to fourth auxiliary lenses or is opaque to block transmission of an optical signal. The light rays passing through the separation region 142 may not be concentrated on the respective focuses of the first to fourth auxiliary lenses. The separation region 142 may be diversely modified according to the shape of the lens array 149. Also, the separation region 142 may be variously modified as long as a light ray passing through the separation region 142 is not concentrated on the focus of the lens array 149. For example, the separation region 142 may be modified to be formed on the other side of the first lens block 140.

In the external shape of the lens array 149, the first to fourth auxiliary lenses are symmetrically arranged with respect to the center axis of the first lens block 140, and the separation region 142 may be formed in the shape of a straight line having a certain width in an area where the first to fourth auxiliary lenses are overlapped. An area between the thin film filters 150 for selecting wavelengths is an empty space through which incident optical signals of all wavelengths pass. To prevent signals of various wavelengths from being incident upon a photodiode (PD), the separation region 142 is formed to be larger than the empty space between the thin film filters 150. The separation region 142 is formed to be opaque to prevent transmission of an optical signal or to have a different radius of curvature from that of the first to fourth auxiliary lenses to prevent the optical signal from being incident upon the photodiode (PD). When the separation region 142 does not exist, optical signals incident upon a boundary between the first to fourth auxiliary lenses may be concentrated on a plurality of focuses. Thus, for each auxiliary lens to provide only one optical signal to a focus, the separation region 142 may be arranged in an area where the first to fourth auxiliary lenses contact one another. The separation region 142 may match an area that spatially separates the first to fourth auxiliary lenses. A plane where the separation region 142 is arranged may not match with the first surface. The separation region 142 may have a different height on the first surface according to a position of the separation region 142. The separation region 142 may be variously modified unless the light ray passing through the separation region 142 is concentrated on the focus of the lens array 149.

The first to fourth auxiliary lenses may be spherical lenses having a certain radius of curvature with respect to each reference point, or aspherical lenses. The first to fourth auxiliary lenses may have the same focal length. When a difference in the wavelengths of optical signals is large, the focal length may be adjusted to fit to the wavelength. The surfaces of the first to fourth auxiliary lenses may be non-reflection coated.

The first lens block 140 may have a first concave 144 formed in the second surface 145b and a second concave 146 arranged inside the first concave 144. The thin film filters 150 may be arranged in the first concave 144. The first concave 144 may have a rectangular shape formed with respect to the center axis of the first lens block 140. A center axis of the second concave 146 may match the center axis of the first concave 144. The depth of the first concave 144 may be greater than the thickness of each of the thin film filters 150. In other words, a vertical distance from a bottom surface of the first concave 144 to the second surface 145b may be greater than the thickness of each of the thin film filters 150. The second concave 146 is circular, and the depth of the second concave 146 may be several to tens of micrometers or more. The depth of the second concave 146 may be sufficiently large such that a Fabry-Perot interferometer effect between the thin film filters 150 and the bottom surface of the second concave 146 can be diminished.

The length of one side of the first concave 144 may be greater than or equal to the diameter of the second concave 146. The thin film filters 150 may be provided on the bottom surface of the first concave 144 to fit to corner portions of the first concave 144. The thin film filters 150 may be bonded to the corner portions of the first concave 144 by using an adhesive. The diameter of the second concave 146 may be greater than the diameter of a lens portion 166 of the second lens block 160.

One surface of each of the thin film filters 150 may be coated to form a wavelength selection filter. The other surface of each of the thin film filters 150 may be non-reflection coated. The thin film filters 150 may be band pass filters or edge filters. For a band pass filter, a full width half maximum (FWHM) may be about 4 nm-30 nm. The thin film filters 150 may include dielectric thin films that are multi-stacked on a glass substrate or a plastic substrate. The central wavelengths of the thin film filters 150 may be different from one another. For example, in case of four (4) channels, the central wavelengths of the thin film filters 150 may be 900 nm, 930 nm, and 960 nm. The first to third channels may be connected to the light receiving devices 124b. The thin film filters 150 may not be arranged in the final fourth channel. The fourth channel may be connected to a light emitting device 124b.

The thin film filters 150 each may have a rectangular shape. The thin film filters 150 are inserted in the first concave 144 and fixed thereto by using an adhesive.

The first lens block 140 may have a protruding portion 141. The protruding portion 141 may extend in a first direction from a plane where the first lens block 140 is arranged. The protruding portion 141 may be inserted in a groove 135 of the base 130 to be aligned thereto. The first lens block 140 may be formed in one body and formed of a transparent material. In detail, the first lens block 140 may be transparent plastic or acryl-based resin.

The first lens block 140 may include a first alignment portion 246. The first alignment portion 246 may be formed as the second surface 145b collapses. In detail, the thickness of the first alignment portion 246 may be reduced as an edge portion of the first lens block 140 collapses with respect to the center axis of the first lens block 140. The second lens block 160 may be inserted around the first alignment portion 246 so that the two may be combined with each other.

The first lens block 140 may include a first lateral surface 147. The first lateral surface 147 may be formed at the opposite side to the protruding portion 141. The first lateral surface 147 may be formed as one side of the first lens block 140 cut along a straight line. The first lateral surface 147 may be used to mount two multiplexers to be close each other. In other words, the two multiplexers may be provided such that the first lateral surfaces 147 of the two multiplexers can face each other.

The first lens block 140 may include a first auxiliary alignment portion 143. The first auxiliary alignment portion 143 may be provided by symmetrically forming grooves in an outer surface of the first lens block 140. The groove may have a cylindrical shape, and the cylindrical shape may be aligned in a direction along the center axis of the first lens block 140.

The second lens block 160 may include a second lens body portion 162, a connection portion 164, and a lens portion 166. The second lens body portion 162 is arranged around the lens portion 166. The second lens body portion 162 may be of a cylindrical shell type. The connection portion 164 has a washer shape, is inserted in the second lens body portion 162, and connects the lens body portion 162 and the lens portion 166. The second lens body portion 162 may support the lens portion 166 and prevent damage of the lens portion 166 due to friction. The second lens block 160 may be manufactured in one body. The second lens block 160 may be formed of a transparent plastic or acryl resin material. The second lens body portion 162 may be insertion combined with the first alignment portion 246. Also, the second lens body portion 162 may be inserted in the first alignment portion 246 and fixed thereto by using an adhesive.

One surface of the lens portion 166 may be a spherical or aspherical surface, whereas the other surface thereof may be a flat surface. Alternatively, the opposite surfaces of the lens body 166 may both be spherical or aspherical surfaces. Accordingly, the lens portion 166 may provide a parallel light to the lens array 149 or provide a parallel light provided by the lens array 149 to the optical fiber ferrule 180 by concentrating the parallel light of the lens array 149. The outer diameter of the lens portion 166 may be less than or equal to the outer diameter of the second concave 146 of the first lens block 140. The second lens block 160 may be diversely modified as long as the second lens block 160 converts a light ray starting from a focus to a parallel light.

The inner diameter of the second lens body portion 162 may be the same as the inner diameter of the first alignment portion 246, within a clearance range. Also, the outer diameter of the second lens body portion 162 may be the same as the outer diameter of the first lens block 140. Accordingly, the first and second lens blocks 140 and 160 may be inserted in the base 130.

The second lens block 160 may include a second lateral surface 167. The second lateral surface 167 may be formed by cutting one side of the second lens block 160 along a straight line. The second lateral surface 167 may be used to mount a plurality of multiplexers. In other words, two multiplexers may be provided such that the second lateral surfaces 167 of the two multiplexers can face each other.

The second lens block 160 may include a second auxiliary alignment portion 163. The second auxiliary alignment portion 163 may be provided by symmetrically forming grooves in an outer surface of the second lens block 160. The groove may have a cylindrical shape, and the cylindrical shape may be aligned in a direction along the center axis of the second lens block 160.

The receptacle 170 may have a cylindrical shape. The optical fiber ferrule 180 may be inserted in the receptacle 170 on a center axis of the receptacle 170. One end of the optical fiber ferrule 180 may be arranged within a focal length of the second lens block 160. One end of the receptacle 170 may include a hole 171 having a diameter that increases along one direction approaching to one end of the receptacle 170. The hole 171 may provide a light procession space in which a light ray starting from the optical fiber ferrule 180 proceeds toward the lens portion 166. Also, the hole 171 may provide a light procession space in which the light ray starting from the lens portion 166 proceeds toward the optical fiber ferrule 180.

The other end of the receptacle 170 may include a hole 173 having a certain diameter. The optical fiber ferrule 180 may be inserted at the other end side of the receptacle 170. One end of the receptacle 170 may be insertion combined with the second body portion 162 by being inserted therein. Also, the receptacle 170 and the second lens block 160 may be fixedly combined with each other by using an adhesive. The outer shape of the receptacle 170 may be modified into a variety of shapes so that an external mounting device may fix the receptacle 170.

For example, the receptacle 170 may include a first washer portion 174 and a second washer portion 176 arranged on a lateral surface in a cylindrical body. Accordingly, a fixing portion (not shown) is inserted between the first washer portion 174 and the second washer portion 176 to fix the receptacle 170.

The optical fiber ferrule 180 may include an optical fiber 184 arranged at a center thereof and a connection portion 182 for supporting the optical fiber 184. The optical fiber 184 may be a single mode optical fiber or a multi-mode optical fiber.

The base 130 includes a center plate 132 having a through hole 131 at a center thereof, a first guard portion 133 having a cylindrical shape and a diameter larger than that of the through hole 131, and arranged at one side of the center plate 132, and a second guard portion 134 having a cylindrical shape and a diameter larger than that of the through hole 131, and arranged at the other side of the center plate 132. The first lens block 140 and the second lens block 160 are sequentially stacked and inserted in the first guard portion 133.

The base 130 may be manufactured in one body. The base 130 may be formed of a high strength plastic material including glass. In particular, the base 130 may be polycarbonate or 30% glass-reinforced grade Ultem. A thermal expansion coefficient of the base 130 may be almost the same as that of the reinforcement plate 110. Accordingly, a unit for restricting deformation due to a difference in thermal expansion between the base 130 and the reinforcement plate 110 may be omitted. The reinforcement plate 110 may be formed of a stainless steel material. Accordingly, the reinforcement plate 110 has superior thermal conductivity and strength so as to provide stability and reliability.

The through hole 131 of the center plate 132 may provide a space in which a light ray proceeds. The diameter of the through hole 131 may be greater than or equal to an outer diameter of an area defining the outermost range of the lens array 149. The first lens block 140 is provided on the center plate 132. The outer diameter of the first lens block 140 may be substantially the same as the inner diameter of the first guard portion 133.

The first guard portion 133 may have a cylindrical shape. The height of the first guard portion 133 may be greater than or equal to the thickness of the first lens block 140. Accordingly, the first lens block 140 and the second lens block 160 may be sequentially stacked inside the first guard portion 133.

The first guard portion 133 may include a concave portion 135 at one side thereof and an auxiliary groove 139 at the other side thereof. The concave portion 135 may be formed as a portion of the first guard portion 133 collapses. A lower surface of the concave portion 135 may match an upper surface of the center plate 132. A lower surface of the auxiliary groove 139 may also match the upper surface of the center plate 132. The protruding portion 141 is inserted in the concave portion 135, thereby aligning the first lens block 140. The auxiliary groove 139 may be formed by vertically cutting the other surface of the first guard portion 133. The cut surface may provide a third lateral surface 137 that may be aligned with the first and second lateral surfaces 147 and 167. The third lateral surface 137 may be used to have a plurality of multiplexers provided adjacent to each other. In other words, two multiplexers may be provided such that the third lateral surfaces 137 of the multiplexers can face each other.

An auxiliary body portion 138 may be combined with the second guard portion 134 and the center plate 132. The auxiliary body portion 138 may have a box shape with a bottom surface and one lateral surface opened. The auxiliary body portion 138 may provide a space for accommodating circuits arranged on a printed circuit board 120. Also, the auxiliary body portion 138 may include a through hole (not shown) at the other surface thereof. The through hole may provide air circulation of the auxiliary body portion 138. Accordingly, the auxiliary body portion 138 and the second guard portion 134 may provide a device arrangement space (not shown). In other words, the second guard portion 134 combined with the auxiliary body portion 138 may provide the device arrangement space in which photoelectric devices 124a and 124b and a photoelectric device driver circuit 126 for driving the photoelectric devices 124a and 124b may be provided.

A substrate 123 may include a first threshold 125 for aligning the photoelectric devices 124a and 124b. The first threshold 125 may be variously modified into a rectangular shape or a strip shape as long as the first threshold 125 can align the photoelectric devices 124a and 124b. The first threshold 125 may be formed by photolithography and etching processes in a process of manufacturing the substrate 123. The substrate 123 may be a GaAs substrate or a ceramic substrate having superior thermal conductivity. For example, first to fourth photoelectric devices 124a and 124b may be aligned to corner portions of the first threshold 125 protruding in a rectangular shape. Also, the substrate 123 may include a conductive pad (not shown), and the conductive pad may be wired to each of the photoelectric devices 124a and 124b. The shape of the first threshold 125 may be variously modified as long as the first threshold 125 can align the photoelectric devices 124a and 124b.

The photoelectric devices 124a and 124b may be provided on the substrate 123 and fixed thereto by using an adhesive. The photoelectric devices 124a and 124b may include a light receiving device 124a and a light emitting device 124b. The light receiving device 124a may be a photodiode, whereas the light emitting device 124b may be a laser diode. In detail, the laser diode may be a vertical cavity surface emitting laser (VCSEL).

For example, the light emitting device 124b may operate in a range of 700 nm-850 nm by using a GaAs or AlGaAs based material, whereas the light receiving device 124a may operate in a range of 900 nm-1600 nm by using an InGaAs based material. In detail, when the center wavelengths of the thin film filters 150 are 900 nm, 930 nm, and 960 nm, the light receiving wavelength band of the light receiving device 124a may operate in a range of 900 nm-1600 nm by using an InGaAs based material. Also, the center wavelength of the light emitting device 124b may be 850 nm by using a GaAs based material. In this case, cross-talk between the light emitting device 124b and the light receiving device 124a is reduced. Accordingly, the thin film filters 150 may be operated, even if performance thereof is degraded.

The substrate 123 may be provided on the printed circuit board 120. A conductive pad (not shown) of the printed circuit board 120 may be electrically connected to the conductive pad of the substrate 123 by wiring. The printed circuit board 120 may be a flexible substrate. An alignment line 121 may be patterned on the printed circuit board 120. The alignment line 121 may be used to align the printed circuit board 120 and the base 130.

An external connection electrode pad 122 is formed at one side of the printed circuit board 120. The external connection electrode pad 122 is connected to an external circuit by electric contact. The substrate 123, the photoelectric devices 124a and 124b, and the photoelectric device driver circuit 126 may be provided on one surface of the printed circuit board 120.

The other surface of the printed circuit board 120 contacts the reinforcement plate 110. The reinforcement plate 110 may be formed of a material having high thermal conductivity and strength. In detail, the reinforcement plate 110 may be formed of stainless steel. The size of the reinforcement plate 110 may be substantially the same as that of the printed circuit board 120. The reinforcement plate 110 and the other surface of the printed circuit board 120 may adhere to each other by an adhesive having a superior thermal conductivity. The adhesive may be epoxy resin.

A material having a thermal expansion coefficient that is similar to that of the base 130 may be selected for the reinforcement plate 110. Accordingly, even when the reinforcement plate 110 is heated to expand, the alignment of the photoelectric device 124a and 124b and the lens array 149 may be maintained. In detail, when the reinforcement plate 110 is formed of stainless steel, the base 130 may be formed of high strength plastic including glass. Accordingly, a thermal deformation restriction unit for restricting thermal expansion or contraction between the reinforcement plate 110 and the base 130 may be removed.

Figure 8:
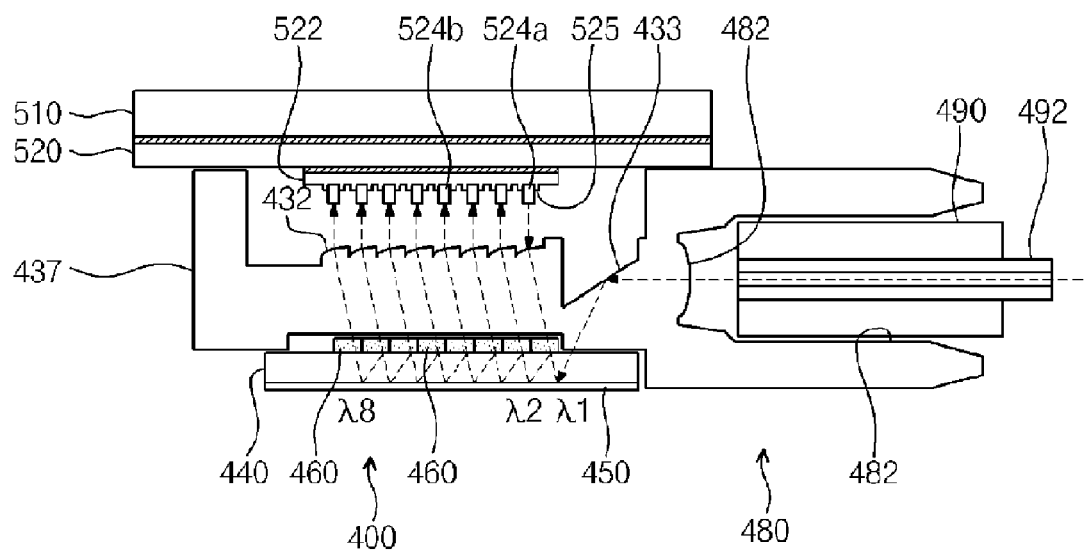
FIG. 8 is a cross-sectional view illustrating a bi-directional multiplexer of an optical communication module according to another embodiment of the present invention.

FIG. 8 is a cross-sectional view illustrating a multiplexer for forming an optical communication module according to another embodiment of the present invention.

Referring to FIG. 8, the multiplexer 400 includes an optical block 440 having a lower surface and a upper surface, which are flat, a reflection coating 450 provided on the lower surface of the optical block 440, a plurality of optical filters 460 arranged to be separated from one another according to a wavelength and provided on the upper surface of the optical block 440, an optical coupling block 480 having a lower surface arranged corresponding to the upper surface of the optical block 440, including a plurality of aspherical lenses 432 formed on an upper surface arranged opposite to the lower surface, and including a body portion 437 surrounding the aspherical lenses 432, a receptacle 490 for accommodating an end of an optical fiber 4192, a focusing lens 482 arranged to be aligned to the receptacle 490, and a beam reflection portion 433 arranged between the focusing lens 482 and the lower surface of the optical coupling block 480 and providing an optical path between the focusing lens 482 and the upper surface of the optical block 440.

The multiplexer may include a flexible printed circuit board 520 interposed between reinforcement plate 510 and photoelectric devices 524a and 524b, and a substrate 522 interposed between the flexible printed circuit board 520 and the photoelectric devices 524a and 524b. The reinforcement plate 510 and the flexible printed circuit board 520 are bonded to each other by using an adhesive. The flexible printed circuit board 520 and the substrate 522 are bonded to each other by using an adhesive. The adhesive may be epoxy-based resin.

The substrate 522 may be formed of ceramic or GaAs. An alignment mark 525 may be patterned on a surface of the substrate 522. Accordingly, the photoelectric devices 524a and 524b may be easily aligned.

The photoelectric devices 524a and 524b may include a light emitting device 524a and a light receiving device 524b. The photoelectric devices 524a and 524b may be mounted on the substrate 522 and fixed by an adhesive. The light receiving device 524b may be a photodiode, whereas the light emitting device 524a may be a laser diode. In detail, the laser diode may be a vertical cavity surface emitting laser (VCSEL).

The light emitting device 524a may operate in a band of 700 nm to 850 nm by using a GaAs or AlGaAs based material. The light receiving devices 524b may operate in a band of 900 nm to 1600 nm by using an InGaAs based material. In this case, cross-talk between the light emitting device 524a and the light receiving device 524b is reduced. Accordingly, the optical filters 460 may be operated, even if performance thereof is degraded.

The multiplexer according to the above-described various embodiments may transmit or receive optical signals of various wavelengths, that is, optical signals of multiple channels, through a single optical fiber. The optical communication module according to the various embodiments of the present invention may simplify a system structure when applied to signal transmission of digital video interactive (DVI), high definition multimedia interface (HDMI), or a display port which requires use of many channels. Also, when a light emitting device and a light receiving device are mixedly arranged, bidirectional transmission is possible, and thus the optical communication module may be functionally extended to be able to transmit signals through various methods such as direct digital control (DDC), RS232, audio, USB, display port, etc. To transmit signals in the various types of methods, for example, 2, 2, 4, 5, and 6 channels are available, and the number of channels through which signals are transmitted and received may be adjusted according to a combination of the photoelectric devices.

To transmit signals of many channels through a single optical fiber, many light emitting devices for emitting light rays of different wavelengths are needed. Thus, when a plurality of light emitting devices are applied to the optical communication module in an optical wavelength-division multiplexing according to the present invention, the light emitting devices may be formed to be able to emit light rays of different wavelengths.

In the field of DVI/HDMI, a four (4) channel method is normally and widely adopted, whereas a six (6) channel method with a bidirectional channel may be adopted to process various additional signals such as direct digital control (DDC), RS232, audio, USB, display port, etc. When the number of photoelectric devices provided on the substrate 123 is designed to fit to the number of channels that are needed, the optical communication module according to the present invention may be applied to a variety of fields needing multichannel, such as DVI/HDMI, direct digital control (DDC), RS232, audio, USB, display port, etc.

The invention claimed is:
1. An optical communication module comprising:
a first bi-directional multiplexer;
a second bi-directional multiplexer;
an optical fiber connecting the first bi-directional multiplexer and the second bi-directional multiplexer;
at least one first light emitting device connected to the first bi-directional multiplexer and operating in a first light emitting wavelength band;
at least one first light receiving device connected to the second bi-directional multiplexer and operating in a first light receiving wavelength band;
at least one second light emitting device connected to the second bi-directional multiplexer and operating in a second light emitting wavelength band that is different from the first light emitting wavelength band; and
at least one second light receiving device connected to the first bi-directional multiplexer and operating in a second light receiving wavelength band,
wherein the first light emitting wavelength band is included in the first light receiving wavelength band, and the second light emitting wavelength band is included in the second light receiving wavelength band;
wherein the first light emitting wavelength band and the first light receiving wavelength band are 620 nm to 870 nm, and the second light emitting wavelength band and the second light receiving wavelength band are 900 nm to 1680 nm;
wherein each of the first bi-directional multiplexer and the second bi-directional multiplexer comprises:
a first lens block including a lens array at one side of the first lens block;
a second lens block including a lens surface corresponding to the lens array and combined with another side of the first lens block;
a receptacle having an optical fiber ferrule fixed at a center of the receptacle and stacked on the second lens block; and
a base combined with the one side of the first lens block;
wherein the first lens block is stacked on the base, the optical communication module further comprising:
a substrate on which photoelectric devices are provided;
a printed circuit board on which the substrate is provided; and
a reinforcement plate on which the printed circuit board is provided;
wherein the reinforcement plate is disposed on a first side of the printed circuit board, and the base is disposed on a second side of the printed circuit board, the second side being opposite the first side.

2. The optical communication module of claim 1, wherein the at least one first light emitting device is a vertical-cavity surface-emitting laser (VCSEL) including AlGaAs or GaAs as an active layer,
the at least one second light emitting device is a VCSEL including InGaAs as an active layer,
the at least one second light receiving device comprises an InGaAs absorption layer grown on an InP substrate, and
the at least one first light receiving device comprises a GaAs absorption layer grown on a GaAs substrate.

3. The optical communication module of claim 1, wherein at least one of the first bi-directional multiplexer and the second bi-directional multiplexer comprises an optical filter.

4. The optical communication module of claim 1, wherein a channel of the first bi-directional multiplexer connected to the at least one first light emitting device does not comprise an optical filter, and a channel of the second bi-directional multiplexer connected to the at least one second light emitting device does not comprise an optical filter.

5. The optical communication module of claim 1, wherein the reinforcement plate includes a stainless steel material and the base includes one of a glass-reinforced polyetherimide material or a glass-reinforced polycarbonate material.

6. The optical communication module of claim 1, wherein a coefficient of thermal expansion of the reinforcement plate is substantially equal to a coefficient of thermal expansion of the base.

* * * * *